April 15, 1941.   N. OLKI   2,238,281
AERATOR
Filed Dec. 1, 1939
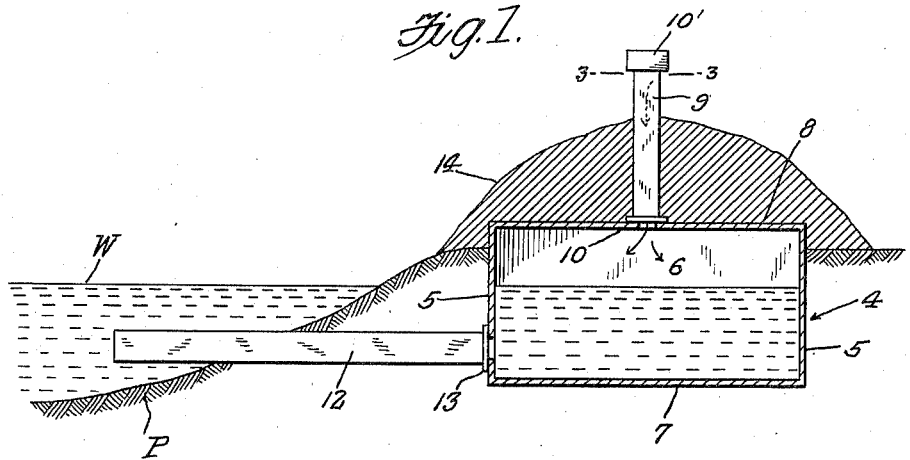
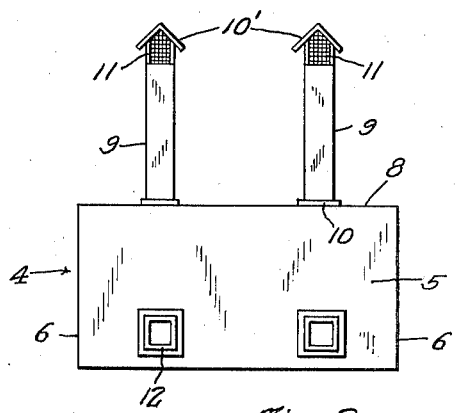
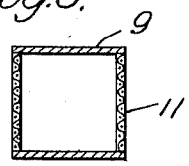
Inventor
*Nick Olki,*
By *Clarence A. O'Brien
and Hyman Berman*
Attorneys Patented Apr. 15, 1941

2,238,281

UNITED STATES PATENT OFFICE 2,238,281

AERATOR

Nick Olki, Calumet, Minn.

Application December 1, 1939, Serial No. 307,160

1 Claim. (Cl. 119—3)

This invention relates to improvements in aerators, and more particularly to the type employed in small lakes or ponds, the main object of the invention being to provide means for the preservation of fish when said lakes or ponds are frozen over.

Another important object of the invention is to provide means for supplying air to fish in lakes or ponds when said lakes and ponds are frozen.

A still further object of the invention is to provide an air and water chamber for disposition below the water surface of a lake or pond, novel means being employed to thoroughly aerate the water in said chamber, and provision also being made to prevent the freezing of the water in the chamber.

Another object of the invention is to provide a device of this character which is characterized by its simplicity, durability of construction, and inexpensiveness to manufacture.

Other objects and advantages of the invention will be apparent during the course of the following description.

With the foregoing in view the invention resides in the novel subject matter hereinafter described and claimed, the description being supplemented by the accompanying drawing in which:

Figure 1 is a longitudinal sectional view showing the device when in use, and constructed in accordance with the principles of my invention.

Figure 2 is an end elevation, and

Figure 3 is a sectional view taken on line 3—3 of Figure 1.

In the drawing wherein for the purpose of illustration is shown a preferred embodiment of the invention, the numeral 4 generally designates an aerator chamber which is substantially rectangular in shape, and is adapted to be placed by a fish pond or lake P. As shown to advantage in Figure 1 of the drawing, the aerator chamber is submerged below the surface of the water W to approximately two-thirds its depth. The aerator chamber 4 may be made of any suitable material such as wood, steel, or concrete, and includes end walls 5, side walls 6, and the bottom 7. There is also provided a top 8. The numeral 9 designates air vents which are secured to the top of the chamber as at 10, and the upper ends of the air vents are provided with caps 10'. The vents are also provided with screens 11 through which air currents enter for aerating the water in the chamber 4, as indicated by the arrows in Figure 1.

The water is furnished to the chamber 4 by means of pipes 12 leading from the lake or pond P. The pipes 12 are connected to the chamber 4 at one end thereof as at 13. In practice the pipes 12 are laid below the surface of the water W to a depth sufficiently deep to prevent the water in the pipes from freezing, and these pipes are of a size to furnish a ready entrance into the chamber for the fish.

In order to prevent the water in the chamber 4 from freezing, I make use of a dirt fill or equivalent material 14 which completely covers the top of the chamber 4, and is built up sufficiently thick to prevent the chamber from freezing.

It is to be understood, of course, that the aerator chambers may be of any size desired and as many used as the exigencies of the case require according to the size of the lake or pond to be served.

From the foregoing it will be seen that I have provided a very novel and unique aerator chamber for use in small lakes or ponds for the preservation of fish when the lakes or ponds are frozen over, and one which will be practically immune from freezing.

It is thought that persons skilled in the art to which the invention relates will be able to obtain a clear understanding of the invention after considering the description in connection with the drawing. Therefore, a more lengthy description is regarded as unnecessary.

Since excellent results are obtainable from the details disclosed, they are preferably followed. However, within the scope of the invention as claimed, numerous modifications may, of course, be made.

Having described the invention what is claimed as new is:

A safety chamber for fish in a frozen pond or lake comprising a casing buried in the earth adjacent the pond or lake and to a depth beyond the freezing point, a conduit leading from the casing adjacent the bottom thereof into the water of the lake or pond well below the water level thereof, said conduit permitting fish to enter the casing and water to flow into the casing and from the casing, said casing having a large upper part located above the plane of the water surface, whereby the water in the casing will leave a large air chamber in the upper part of the casing and an air pipe in communication with the air chamber and extending upwardly from the top of the casing through the earth to a point above the earth and a cap closing the upper end of the pipe, the upper part of the air pipe having an opening therein for the entrance of air through the pipe into the air chamber.

NICK OLKI.